March 28, 1950     J. D. RUST     2,502,063
COTTON PICKING MACHINE

Filed Aug. 8, 1944     3 Sheets-Sheet 3

Inventor,
John D. Rust,
By Albert E. Dieterich,
Attorney.

Patented Mar. 28, 1950

2,502,063

UNITED STATES PATENT OFFICE 2,502,063

COTTON-PICKING MACHINE

John D. Rust, Memphis, Tenn.

Application August 8, 1944, Serial No. 548,527

4 Claims. (Cl. 56—11)

My invention relates to the type of cotton picking machines illustrated, for example, in Letters Patent No. 2,058,514 issued October 27, 1936.

The primary object of the present invention is: to provide a tractor powered cotton picking machine in which one or two picking machine units are mounted on and powered by a tractor having front and rear wheels spaced to span two rows of cotton and picking units so mounted that they will rise and fall with the front wheels of the machine according to the contour of the ground; in the two-row machine the picking units are located one at each side of the tractor while in the one-row machine, only one picking unit is mounted in a similar manner on either the left or right side of the tractor; the front wheels are steered with a suitable steering gear and the cotton plants are protected by suitable fenders.

Other objects will in part be obvious and in part be pointed out hereinafter.

To the attainment of the aforesaid objects and ends, the invention further resides in those novel details of construction, combination and arrangement of parts all of which will be hereinafter described in detail and then be specifically pointed out in the appended claims, reference being had to the accompanying drawings in which:

Figure 1:
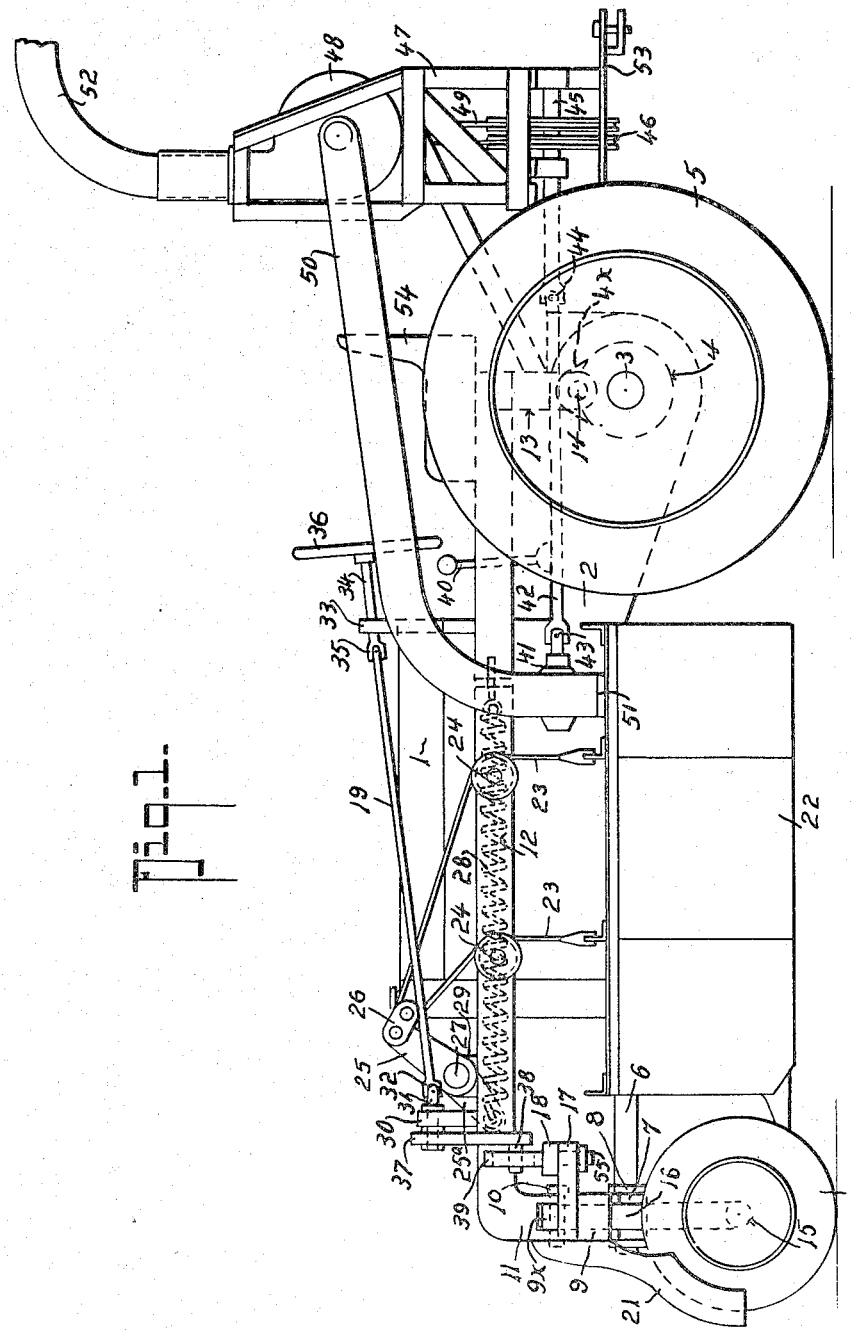
Fig. 1 is a side elevation of a cotton picker according to my invention.

In the drawings in which like numerals of reference indicate like parts in both figures, 1 represents a tractor having the usual transmission mechanism enclosed in a case 2 and having the usual rear axles 3 and axle housings 4. The rear or traction wheels are indicated by the numeral 5.

Projecting forwardly from and centrally of the machine is a shaft or tube 6. The front axle 9 carries a bearing 7 which is journaled on the shaft 6 and is slidable along the shaft between collars 8 to provide for a slightly varying wheel base as a result of travel over uneven ground, for example, should one of the wheels 20 be riding over a ridge in the ground while the other wheel 20 and the wheels 5 are on level ground, the center of the higher wheel does not lift along a vertical line but along an arc having as its center the axis of the pin 14. This necessitates a loose connection between shaft 6 and collars 8 to allow some forth and back movement of axle 9 along shaft 6.

Each picker unit 22 is suspended from a beam 12 which has front and back upright ends 11 and 13 respectively. Each beam 12 is spaced laterally of the body 1 of the tractor and has a front upright 11 at one end and a rear upright 13 at the other end. The front end 11 of each beam is pivotally connected to a front axle 9, as at 10, the pivotal axis lying in the same longitudinal direction as the beam; the rear upright 13 is pivotally mounted on the rear axle housing 4 of the tractor, as at 14, the pivotal axis lying parallel to that of the rear axle 3 of the tractor. In the drawing 4ˣ indicates lugs on the axle housing between which the rear uprights 13 are pivoted, while 9ˣ indicates lugs on the axle 9 to which the front uprights 11 are pivoted. The pivotal connections 10 and 14 are loose ones.

Mounted in the ends of the front axle 9 are the front wheel spindles 15, 16, the portions 16 of the same being pivotally mounted in the axle 9 to turn on vertical axes while the portions 15 extend laterally to serve to receive the front wheels 20. The specific structure of the axle 9, and spindles 15, 16 may be any well known or approved type.

Figure 2:
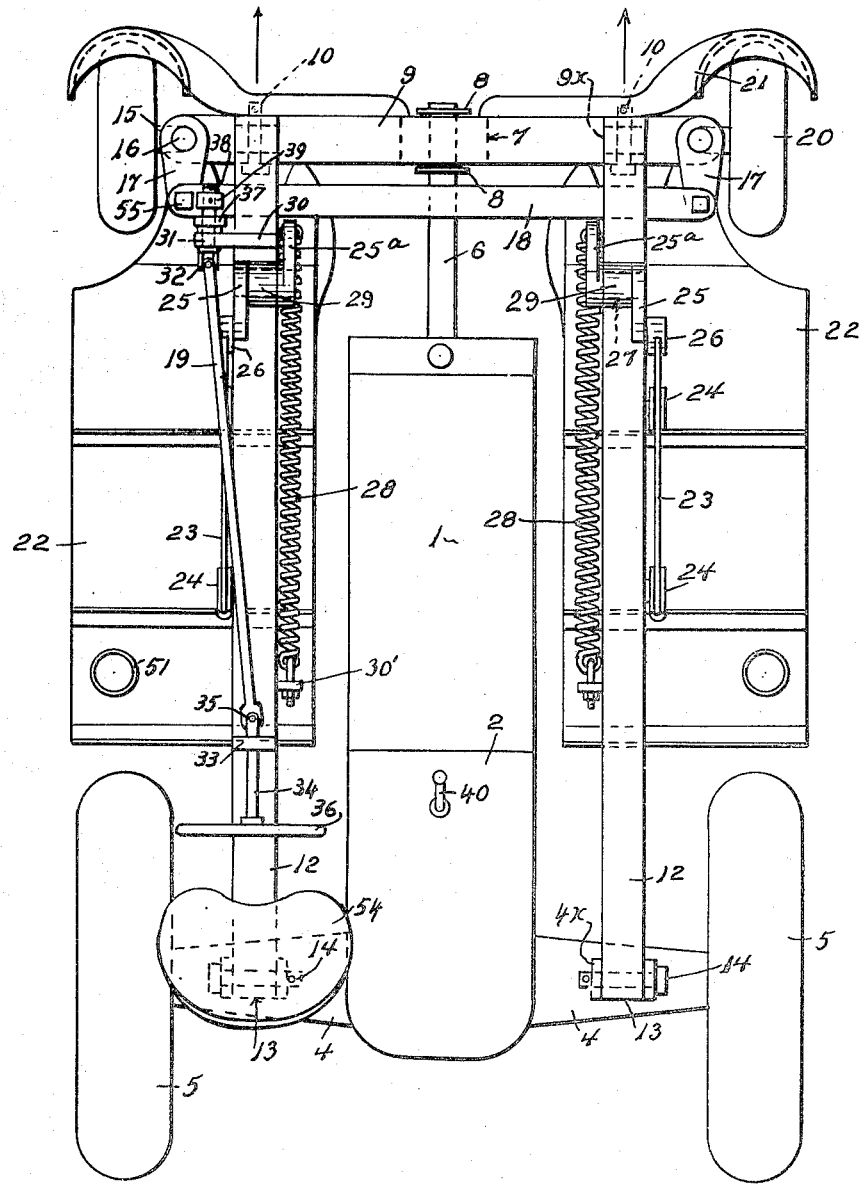
Fig. 2 is a top plan view of the two-row machine, parts being omitted. The one-row mounting is not shown in the drawings as it would be the same as Fig. 2 with one cotton picking unit omitted.
Figure 3:
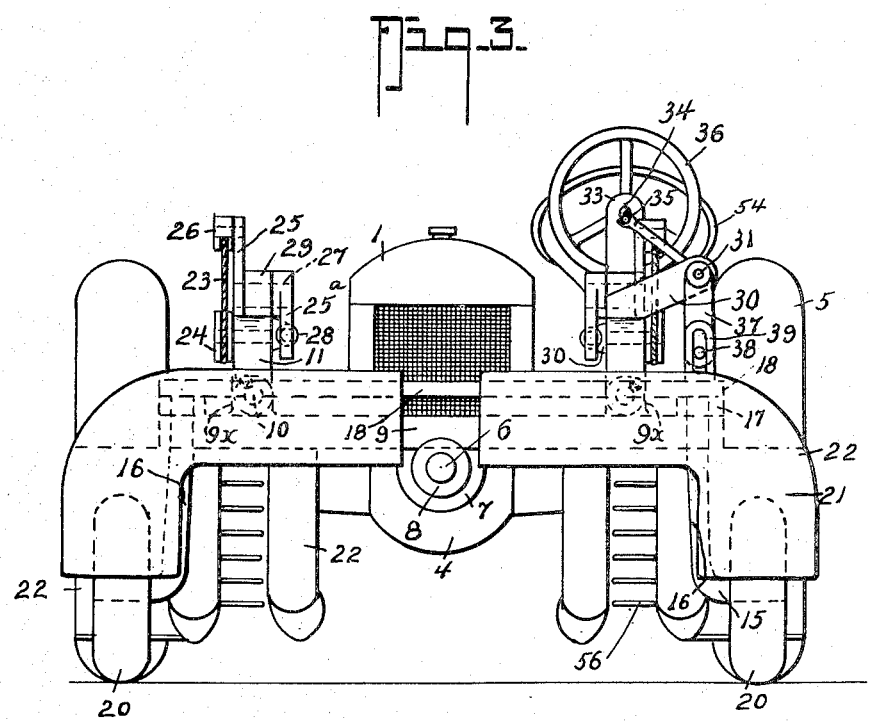
Fig. 3 is a front view of the parts shown in Fig. 2.

The vertical portions 16 of the front wheel pindles carry arms 17 which are connected together to turn in unison by a suitable cross tie rod 18, as best illustrated in Fig. 2.

Suitable fenders 21 are provided to protect plants from abuse by the front wheels 20 and axle 9.

As best shown in Fig. 1 the cotton picking units 22 are suspended by cables 23 passed over pulleys 24 on the beams 12 and connected to links 26 which are pivoted to the levers 25. The levers 25 are carried by shafts 27 mounted in bearings 29 on the beams 12. Other levers 25ᵃ on shafts 27 are connected to balancing springs 28 which are anchored to the beams 12 as indicated at 30' in Fig. 2.

In the drawings 30 is a bracket extending from one of the beams 12 and carrying a stub shaft 31 to which the steering shaft 19 is connected by a universal joint 32. A second bracket 33 supports the shaft 34 of a steering wheel 36, which shaft is connected to shaft 19 by a universal joint 35.

A crank 37 is secured to shaft 31 and has a wrist pin 38 that works in a slotted post 39 that is mounted on the cross tie rod 18. The rod 18 is pivoted at 55 to the arms 17. 40 designates the usual gear shifting lever of the tractor while 41 is a power off-take mechanism from the tractor, the driven shaft 41 of such mechanism being connected with a pulley shaft 45 via a connecting shaft 42 and universal joints 43 and 44 as shown in Fig. 1. 47 is a frame which supports suction blowers (one for each picking unit) 48 to which ducts 50 from the cotton outlets 51 of the picking machines 22 are connected and to which cotton delivery ducts 52 are also connected. The blowers are driven from shaft 45 by belts 49 passing over pulleys 46.

A draft coupling 53 is provided to which a cotton receiving cart (not shown) may be attached.

A seat 54 is provided for an operator.

Since the construction of the pickers 22 and their accessories are not per se a part of the present invention, further description of the same herein is thought to be unnecessary. The spacing of the rows of cotton plants is indicated by the arrows in Fig. 2. The wheels of the machine run between the rows and straddle two rows of plants.

From the foregoing description taken in connection with the accompanying drawings it is thought the construction, operation and advantages of the invention will be clear to those skilled in the art.

What I claim is:

1. In a cotton picking machine wherein is provided a power plant, a frame, traction wheels and axles with an axle housing, and steering wheels, and two cotton picking units, one disposed at one side of the power plant and the other disposed at the other side of the same, the improvement which comprises a rigid shaft projecting forwardly of the power plant, a front axle rockably and slidably mounted on said shaft, means for mounting said steering wheels on said front axle and cotton picker carrying means operatively mounted on said front axle and on said axle housing.

2. In a cotton picking machine wherein at least one cotton picking unit is carried by a tractor having a body, a pair of traction wheels and a rear axle housing; the improvement which includes a front axle for the tractor; means to mount said axle for rocking and sliding movement on a central longitudinal axis of the body of the tractor, a longitudinally disposed beam at each side of the tractor and spaced from the body of the tractor, means for mounting said beams pivotally on a common transverse axis on the housing of the rear axle of the tractor, and means for pivotally mounting said beams on separate longitudinal axes on said front axle, said cotton picking unit being suspended from one of said beams.

3. In a cotton picking machine, two cotton picking units disposed, one at either side of a tractor power plant and between the front and rear wheels of the tractor, the tractor having a rear axle housing, a rigid shaft projecting centrally forwardly of the power plant, a longitudinally disposed beam at each side of the power plant, means pivotally mounting each beam at one end on said rear axle housing on a transverse axis, a front axle on which said front wheels are mounted, means for mounting said front axle on said rigid shaft for rocking and back and forth movement on the same, by virtue of all of which the front ends of said beams will rise and fall with the ends of the front axle as the front wheels follow the contour of the ground, and means to carry the cotton picking units on each beam, said front and back wheels being spaced to straddle two rows of plants.

4. In a cotton picking machine wherein is provided a tractor which itself includes a power plant, a rear axle housing and rear traction wheels; the improvement which comprises a beam at each side of the power plant, means pivotally mounting the rear end of each beam on said rear axle housing, a front axle, a pair of steering wheels operatively mounted on said front axle one each adjacent its ends, means for mounting the front end of each beam on said front axle on axes which are normal to the pivotal axes at the rear of each beam, and means for mounting said front axle for rocking and sliding movement on a central longitudinal axis of the tractor.

JOHN D. RUST.

REFERENCES CITED

The following references are of record in the file of this patent:

UNITED STATES PATENTS

| Number | Name | Date |
|---|---|---|
| 777,595 | Campbell | Dec. 13, 1904 |
| 1,755,524 | Stanfield | Apr. 22, 1930 |
| 1,799,368 | Hendrickson | Apr. 7, 1931 |
| 1,959,070 | Thomann | May 15, 1934 |
| 2,073,653 | Rust | Mar. 16, 1937 |
| 2,178,505 | Warneke | Oct. 31, 1939 |

FOREIGN PATENTS

| Number | Country | Date |
|---|---|---|
| 827,226 | France | Jan. 24, 1938 |